United States Patent [19]

Symonds

[11] Patent Number: 4,821,499
[45] Date of Patent: Apr. 18, 1989

[54] ROTARY RAKES

[76] Inventor: Darrell C. Symonds, 13 Linkwater Street, Shelley, Australia, 6155

[21] Appl. No.: 201,331

[22] Filed: May 31, 1988

Related U.S. Application Data

[63] Continuation of Ser. No. 849,706, Apr. 9, 1986, abandoned.

[30] Foreign Application Priority Data

Apr. 9, 1985 [AU] Australia .............................. PH00062

[51] Int. Cl.⁴ ............................................ A01D 78/14
[52] U.S. Cl. ...................................................... 56/377
[58] Field of Search ................. 56/377, 366, 367, 370, 56/395–397, DIG. 2; 172/314, 320, 599–601, 657

[56] References Cited

U.S. PATENT DOCUMENTS

| | | | |
|---|---|---|---|
| 2,844,935 | 7/1958 | Cooley | 56/377 |
| 2,872,773 | 2/1959 | Van Der Lely et al. | |
| 2,922,269 | 1/1960 | Van Der Lely et al. | 56/377 |
| 2,930,178 | 3/1960 | Van Der Lely et al. | |
| 2,949,719 | 8/1960 | Van Der Lely et al. | |
| 2,975,583 | 3/1961 | Van Der Lely et al. | 56/377 |
| 3,031,834 | 5/1962 | Van Der Lely et al. | 56/377 |
| 3,038,292 | 6/1962 | Van Der Lely et al. | |
| 3,080,699 | 3/1963 | Van Der Lely et al. | 56/377 |
| 3,135,082 | 6/1964 | Czajkowski | |
| 3,151,431 | 10/1964 | Daugherty | |
| 3,151,435 | 10/1964 | Johnston | |
| 3,218,788 | 11/1965 | Hubbard | |
| 3,279,160 | 10/1966 | Worrel | |
| 3,320,735 | 5/1967 | Sutherland et al. | |
| 3,376,697 | 4/1968 | Perold | |
| 3,609,950 | 10/1971 | Remy | |
| 4,231,218 | 11/1980 | Delgado | |
| 4,324,093 | 4/1982 | Van Der Lely et al. | |

Primary Examiner—Bruce M. Kisliuk
Attorney, Agent, or Firm—Cushman, Darby & Cushman

[57] ABSTRACT

A rotary rake in which the angular relationship of pin wheels and swing arm supports relative to a forward direction is such as to cause debris being collected to be caused to roll to one side, thereby increasing debris-collection potential.

3 Claims, 4 Drawing Sheets

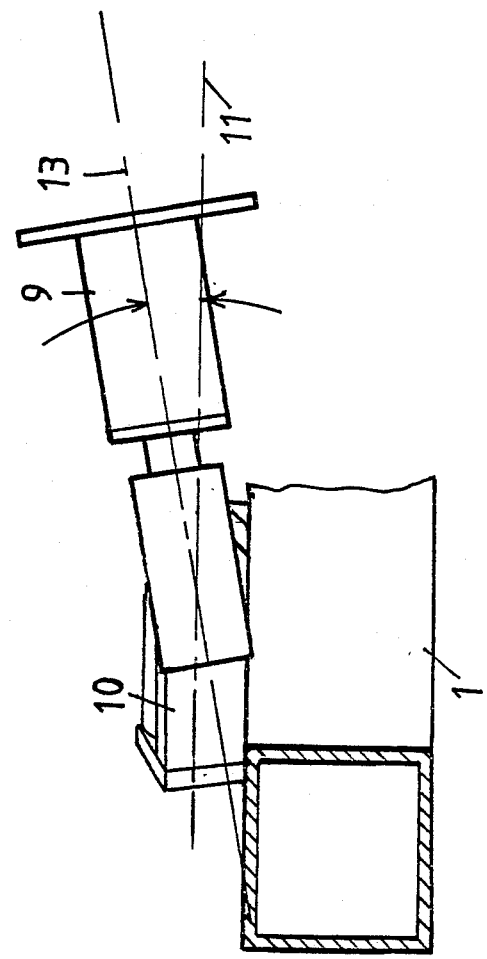

ROTARY RAKES

This is a continuation of application Ser. No. 849,706, filed Apr. 9, 1986, which was abandoned upon the filing hereof.

BACKGROUND OF THE INVENTION

This invention relates to rotary rakes.

Rotary rakes are well known where there is provided a plurality of pin wheels (also known as rake wheels) arranged in an echelon arrangement with each pin wheel including a hub and outwardly extending fingers and each pin wheel being supported by a separate arm pivotally supported from a common support frame, and wheels providing for ground support of the common frame and adapted to thereby support the pin wheels for an aligned tracking across ground to be cleared.

The problem to which this invention is directed relates to the difficulty of using such a rotary rake in an application where large pieces of timber are to be raked, and large volume of debris with such timber pieces is required to be raked.

The application which illustrates the problem best relates to clearance of pine forests such as are found in many locations in the United States of America.

Pine trees that have reached a height of perhaps eighteen to twenty feet and which have been cut, can form debris including such lengths of timber as is appropriate from such forest clearing operations together with the many stumps that have been loosened from ground engagement by an underneath cutting of their roots.

In order to most economically and effectively rake such debris into side rows requires that any such rake shall be firstly of large size and secondly that it will handle such debris load such that it can consistently and continually rake such debris in a continuous path.

SUMMARY OF THE INVENTION

What has been discovered is that by changing angular relationships of the parts of such a rotary rake as has previously existed, that can cause the rake to act in a quite different way on debris being collected which significantly improves the ability of a rake to handle greater concentrations of debris that has been the case with rakes of previous design.

The invention provides a rotary rake comprising a pluality of pin wheels (i.e. rake wheels) in an echelon arrangement, each pin wheel including a hub and a plurality of radially outwardly extending fingers, the pin wheels being each supported by an arm pivotally supported from a common support frame, and wheels providing for ground support of the common frame and adapted to thereby support the pin wheels for an aligned tracking across ground to be cleared. Each of the pin wheels is rotatable about an axis the angular relationship of which relative to a supportive ground plane is such, and its relative relationship to each of the respective arm support axis is such that there is provided a tendency to effect with respect to timber debris being raked, a collective rolling effect on such material.

In preference, each pin wheel is centrally supported to be rotatable about an axis aligned to be within the range of seven to thirteen degrees to a ground supporting plane of the rake.

In preference, each pin wheel is centrally supported to be rotatable about an axis aligned to be within the range of forty one to forty nine degrees when considered in plan relative to the pivot axis of the arm supporting the pin wheel.

In preference, the extent of overlap of one pin wheel as compared to each immediately following pin wheel is such that when viewed from an immediately forward position an outermost and rearwardmost portion of each leading pin wheel is substantially aligned with the middle of the immediately following pin wheel.

In a further form the invention provides a rotary rake comprising a plurality of pin wheels (i.e. rake wheels) in an echelon arrangement, each pin wheel including a hub and outwardly extending fingers, the pin wheels being each supported by an arm pivotally supported by a common support frame, and wheel providing for ground support of the commom frame and adapted to thereby support the pin wheels for an aligned tracking across ground to be cleared. Each of the pin wheels is supported to be rotatable about an axis the angular relationship of which relative to a supporting ground plane is within the range of seven to thirteen degrees, and its relative relationship to each respective arm support axis is within the range when considered in plan of forty one to forty nine degrees.

The invention further provides a method of raking which comprises passing a rotary rake across ground to be cleared where the rake is characterized as previously set out and used so that there is caused a tendency to effect, with respect to timber debris being raked, a collective rolling effect on such material.

In preference the method includes retaining the respective pin wheels so that they will be within the parameters as hitherto set out when in use.

BRIEF DESCRIPTION OF THE DRAWINGS

For a better understanding of this invention it will now be described with reference to a preferred embodiment which will be described with the assistance of drawings wherein:

FIG. 4 is a side elevation view illustrating the relationship of the axis supporting at the hub each pin wheel with respect to the supporting frame.

DETAILED DESCRIPTION

Figure 1:
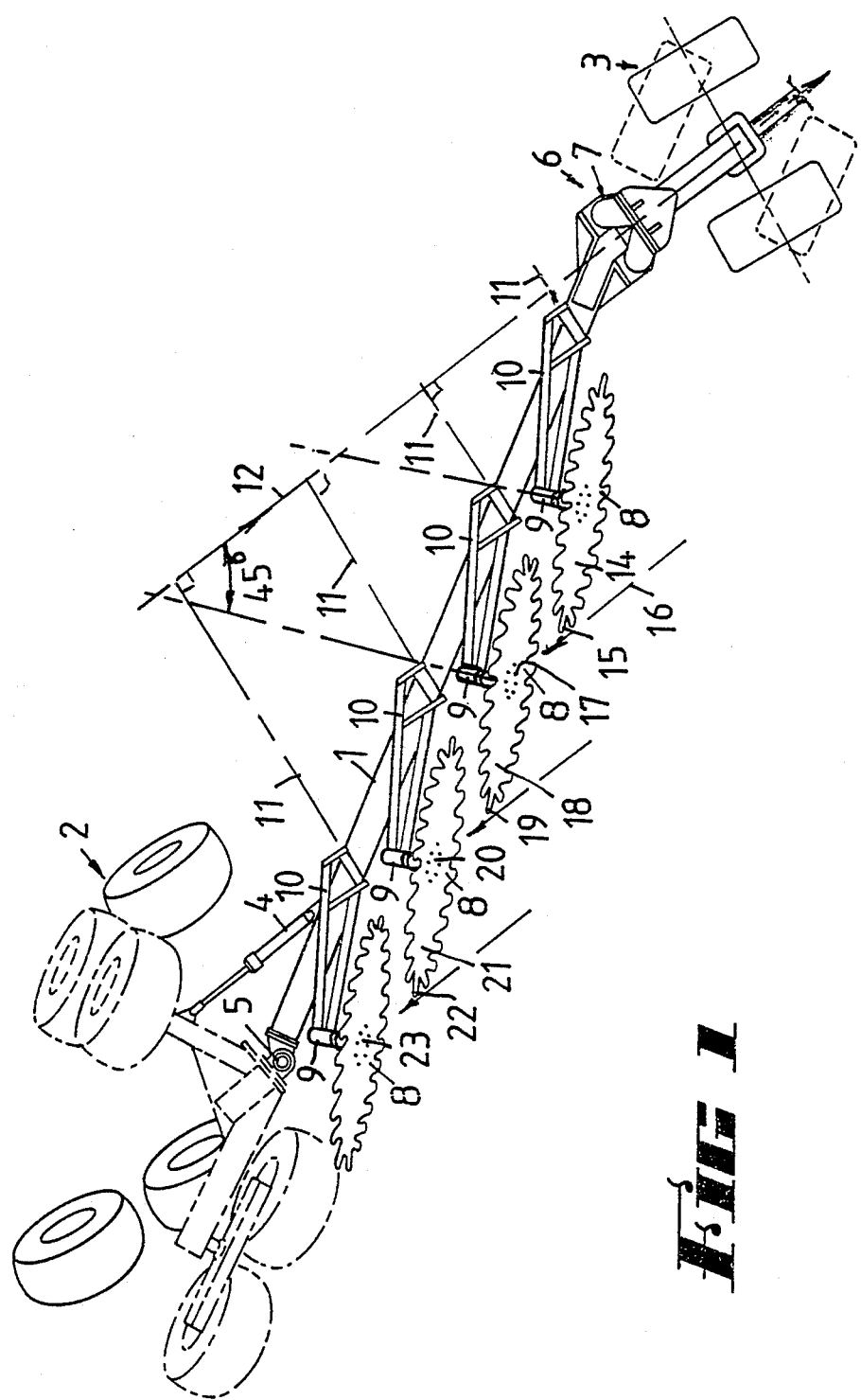
FIG. 1 is a schematic plan view of a rake according to a preferred embodiment.
Figure 2:
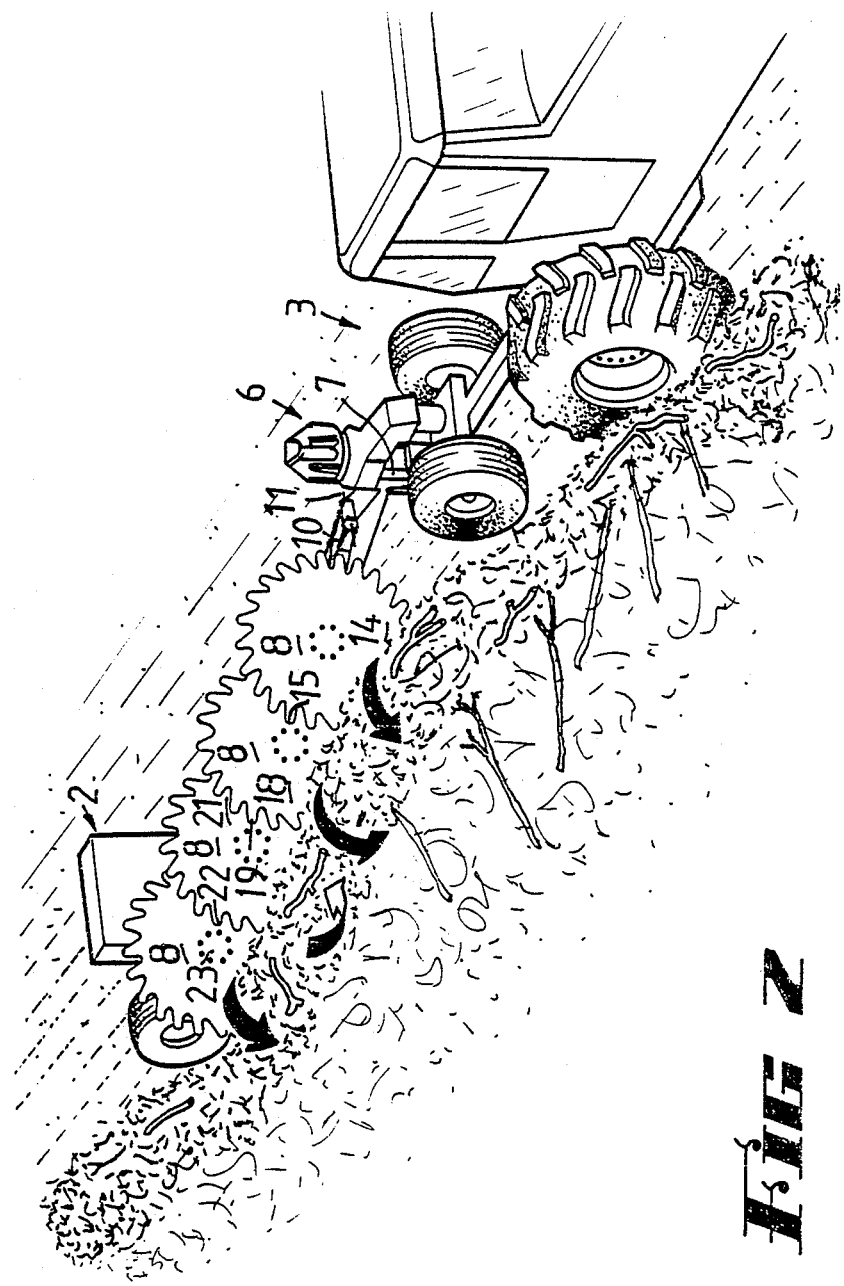
FIG. 2 is a perspective view of the same rake as in FIG. 1 illustrating however the manner in which the rolling effect on the debris is effected.
Figure 3:
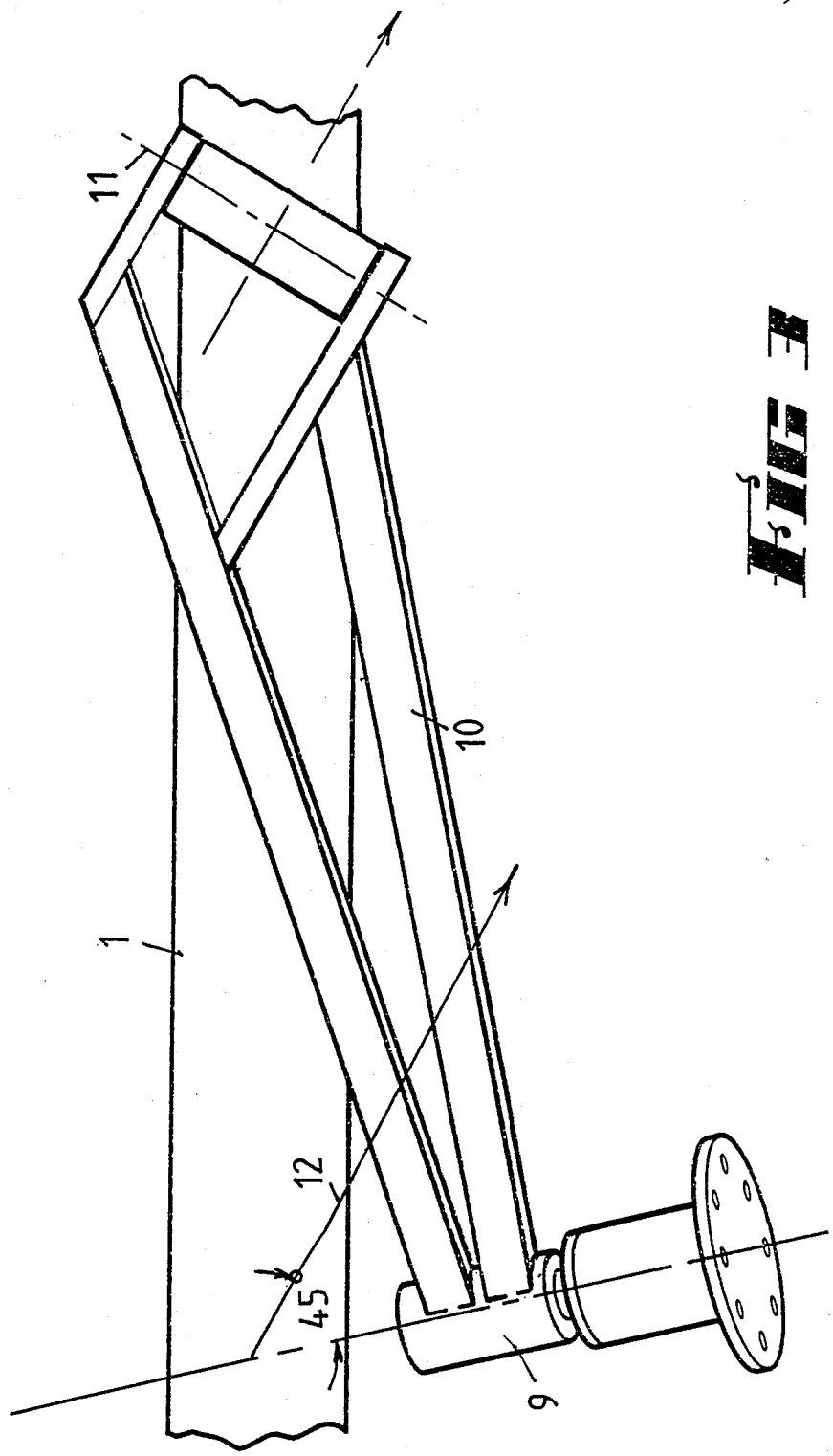
FIG. 3 is a top plan view of one of the swing arms with the pin wheel removed showing thereby the hub used to support a pin wheel.

The knowledge and developments pertaining to rotary rakes are well known.

Such rakes conventionally include features as are illustrated, except in this case, the angular relationships of the parts are believed to be novel.

The embodiment then, is a rotary rake which includes a main frame 1 with a rear bogie 2 and a forward bogie at 3.

The position of the rear bogie 2 is governed by a hydraulically operable ram 4 which controls the position of the bogie 2 about a pivotal support 5.

Such positioning of the rear bogie 2 governs the angular relationship of the main frame 1 which comprises an elongate beam supported at a front end 6 in such a way that there are two hydraulic arms 7 which can be operated to lift or lower the relative height of the beam relative to a ground support plane.

The forward bogie 3 is pivotally supported at 6 to the forward end of the main frame 1.

Secured at spaced intervals along the main frame 1 is a plurality of pin wheels (i.e. rake wheels) 8, each rotatably supported for rotation about a hub 9 which, in turn, is supported by a swing arm 10.

Each swing arm 10 is supported so as to be rotatable about an axis at 11 the orientation of which is selected so as to be substantially transverse to an expected forward direction.

Each swing arm 10 is supported so that it can rise and fall according to corresponding pressures that might arise during operation on its respective pin wheel 8.

A lowermost position of each swing arm 10 is established by a part of the swing arm 10 engaging against a top edge of the main frame 1.

The support for each respective hug 9 is such that that hub will be maintained so that its axis will be disposed in a plane which when viewed in plan as in FIG. 1, is aligned at 45 degrees to the forward direction indicated by guideline 12.

Guideline 12 is exactly transverse to the respective axes 11.

While a rotary rake does not have to be used so that its alignment is exactly in any given direction, there is a preferred direction to which all of the other alignments and orientations are compared and will work to best advantage.

Each of the axes 11 is selected to be best operating so that it is directly transverse to the best operating position of a forward direction.

A further important orientation relates to the inclination of the axis of each hub 9 with respect to a ground plane.

This is best shown in FIG. 4 in which, when the swing arm rests on the top edge of the main frame, the axis 13 of each hub 9 is disposed at 10 degrees to the ground plane (which, in FIG. 4, is parallel with the dashed line indicated by axis 11 of the pivot support for each swing arm 10).

As a result in the pin wheel has a forward face which is inclined rearwardly from a ground engaging position at 10 degrees to the vertical.

This presumes, and indeed it is the case, that the front face of each pin wheel is planar and is supported so as to be disposed at 90 degrees to the axis of the supporting hub.

It is, of course, presumed that each of the pin wheels 8 is parallel one to the other when in their lowermost position and the respective axes of the hubs 9 and the swing arms 10 are likewise supported in parallel relationship one to the other.

A further relevant feature is that when the rake is being pulled in a forward direction for raking purposes, the extent of overlap of each of the pin wheels 8 with adjacent others of the pin wheels 8 is also a factor in efficient and continually concentrated operation.

Accordingly, the relative alignment of each of the pin wheels 8 is such that choosing the forwardmost pin wheel 14, this is supported and aligned so that an outermost and rearwardmost part 15 when viewed in the direction as shown with arrow 16, i.e. immediately in front and aligned so that the view is in the alignment of an expected forward direction of the rake, then such part 15 will be aligned to coincide with the centre at 17 of the following pin wheel 18.

Likewise, each of the pin wheels, for instance, the pin wheel 18, has its outermost and rearwardmost portion, at 19, aligned with the centre 20 of pin wheel 21 which, in turn, has its outermost and rearwardmost portion 22 aligned with the centre of the hub 23.

The significant advantage of the rake as described is that when used with such relative orientations and with the approximate proportions as shown, it can be found to cause debris particularly of a type resulting from pine trees that have been cut where these were of a height of approximately sixteen to twenty feet, to roll in front of the raking action.

Hitherto, the debris has been found to simply build up, but to remain essentially stratified as it is gathered and to keep such stratification, possibly because of the large timbers within the debris.

The disadvantage of such static stratification is that the material is then much more difficult to be caused to be diverted into a side windrow.

The quite surprising discovery of the present invention is that by a selection of angular relationships, debris essentially of the type described can be caused to collectively roll in front of the pin wheels and such action, both because of the general alignment of the pin wheels and their overlapping relationship, has a result that such rolling debris can be more easily caused to shift to a side and hence be pushed into a common row for subsequent clearance purposes.

It will be clear that there is some tolerance in the dimensions that can be selected, although those given are those most preferred.

The test is to take a rotary rake of common type, and then change the dimensions and orientations toward those given and, by trials it will be found the improved result can be achieved with the better result as the disclosed dimensions are arrived at.

Individual ranges of relative angles have been given which have been found to indicate generally the limits to which changes can go while still keeping relative effectiveness.

The advantages of the invention are of enormous significance in that hitherto debris of the type being discussed has not been able to be raked in the manner described for any continuous consistent period.

By being able to now continuously rake the materials, this removes the need for previous techniques such as using vehicles with front-clearing rakes using a to-and-fro clearing action.

Such to-and-fro clearing action, for instance using a Caterpillar tractor with more than one blade, requires some three to four times the time for such clearing as has been found in some instances using the present preferred embodiment.

The claims defining the invention are as follows:

I claim:

1. A rotary rake for raking large pieces of timber and associated debris resulting from forest-clearing operations and disposed on a ground plane, laterally to one side in relation to a longitudinally forward direction of travel of the rake along a towing path, for rolling the large timber pieces and associated debris in a longitudinally continuous windrow extending along said side of said path, said rake comprising:

an elongated, generally horizontal main frame; said main frame being obliquely oriented as seen in top plan view so as to have a forward end, and a rearward end displaced laterally towards said side in relation to said longitudinally forward direction;

said main frame having a forward end, and ground-supported front bogey wheel means supporting said forward end;

said main frame further having a rear end, and ground-supporting rear bogey wheel means supporting said rear end;

tow bar means operatively connecting with said forward end of said main frame for towing said rotary rake in said longitudinally forward direction along said towing path;

a plurality of rake wheels, each including a generally planar hub portion having a plurality of circumferentially-spaced, radially outwardly-extending rake fingers provided thereon and extending on an outer periphery thereof;

each rake wheel including an axle means extending axially, centrally from said hub portion thereof, each axle means having a longitudinal axis extending transversally to the respective said generally planar hub portion and defining an axis of rotation for the respective said rake wheel;

a plurality of cantilever-type rake wheel support arms, corresponding in number to said plurality of rake wheels;

each rake wheel support arm including a leading end and a trailing end;

each rake wheel support arm trailing end being provided with a hub which journals a respective said rake wheel axle means for rotation about a respective said axle means longitudinal axis;

each rake wheel support arm leading end being provided with pivot means pivotally securing the respective support arm to said main frame for pivotal movement about a respective pivot axis;

support means provided on said main frame for supportingly engaging each said rake wheel support arm and thereby providing a lower limit to downward pivoting of the respective rake wheel support arm, in which position the respective rake wheel is cantilevered from the main frame by the respective pivot means and has respective ones of said rake fingers below the respective rake wheel hub portion disposed to intersect said ground plane, but permitting the respective said support arm temporarily to pivot upwards, away from said support means, when, in use, the respective rake wheel encounters obstacles located above said ground plane;

said rake wheels being thereby arranged in a series in an echelon arrangement in which, as seen looking longitudinally backwards along said towing path, each further forward said rake wheel overlaps each respectively adjacent but further rearward said rake wheel nearly to axially centrally of the latter, and each said respectively adjacent but further rearward rake wheel extends further laterally to said one side of said towing path than the respectively adjacent further forward said rake wheel;

each said axle means longitudinal axis being oriented to extend at an angle of 41 to 49 degrees, as seen in top plan view to said pivot axis, of the respective said support arm;

each said axle means longitudinal axis being oriented to extend at an angle of 7 to 13 degrees, as seen in front elevational view, above said ground plane, when the respective said support arms are supported on said support means; and each said pivot axis being generally horizontal and oriented to extend at substantially a right angle, as seen in top plan view, to said longitudinally forward direction.

2. The rotary rake of claim 1, wherein:

said generally horizontal main frame is provided with a generally horizontal upper edge which provides said support means for supportingly engaging each said rake wheel support arm.

3. A method for raking large pieces of timber and associated debris resulting from forest-clearing operations and disposed on a ground plane, laterally to one side in relation to a longitudinally forward direction of travel of the rake along a towing path, for rolling the large timber pieces and associated debris into a longitudinally continuous windrow extending along said side of said path, said method comprising:

providing a rotary rake which includes:

an elongated, generally horizontal main frame; said main frame being obliquely oriented as seen in top plan view so as to have a forward end, and a rearward end displaced laterally towards said side in relation to said longitudinally forward direction;

said main frame having a forward end, and ground-supported front bogey wheel means supporting said forward end;

said main frame further having a rear end, and ground-supporting rear bogey wheel means supporting said rear end;

tow bar means operatively connecting with said forward end of said main frame for towing said rotary rake in said longitudinally forward direction along said towing path;

a plurality of rake wheels, each including a generally planar hub portion having a plurality of circumferentially-spaced, radially outwardly-extending rake fingers provided thereon and extending on an outer periphery thereof;

each rake wheel including an axle means extending axially, centrally from said hub portion thereof, each axle means having a longitudinal axis extending transversally to the respective said generally planar hub portion and defining an axis of rotation for the respective said rake wheel;

a plurality of cantilever-type rake wheel support arms, corresponding in number to said plurality of rake wheels;

each rake wheel support arm including a leading end and a trailing end;

each rake wheel support arm trailing end being provided with a hub which journals a respective said rake wheel axle means for rotation about a respective said axle means longitudinal axis;

each rake wheel support arm leading end being provided with pivot means pivotally securing the respective support arm to said main frame for pivotal movement about a respective pivot axis;

support means provided on said main frame for supportingly engaging each said rake wheel support arm and thereby providing a lower limit to downward pivoting of the respective rake wheel support arm, in which position the respective rake wheel is cantilevered from the main frame by the respective pivot means and has respective ones of said rake fingers below the respective rake wheel hub portion disposed to intersect said ground plane, but permitting the respective said support arm temporarily to pivot upwards, away from said support means, when, in use, the respective rake wheel encounters obstacles located above said ground plane;

said rake wheels being thereby arranged in a series in an echelon arrangement in which, as seen looking longitudinally backwards along said towing path, each further forward said rake wheel overlaps each respectively adjacent but further rearward said rake wheel nearly to axially centrally of the latter, and each said respectively adjacent but further rearward rake wheel extends further laterally to said one side of said towing path than the respectively adjacent further forward said rake wheel;

each said axle means longitudinal axis being oriented to extend at an angle of 41 to 49 degrees, as seen in top plan view, to said pivot axis of the respective said support arm;

each said axle means longitudinal axis being oriented to extend at an angle of 7 to 13 degrees, as seen in front elevational view, above said ground plane, when the respective said support arms are supported on said support means; and each said pivot axis being generally horizontal and oriented to extend at substantially a right angle, as seen in top plan view, to said longitudinally forward direction; and towing said rotary rake by said tow bar means, in a longitudinally forward direction, along said towing path, on said ground plane, through a region in which large pieces of timer and associated debris resulting from forest-clearing operations lie disposed on the ground plane.

* * * * *